Patented Jan. 21, 1936

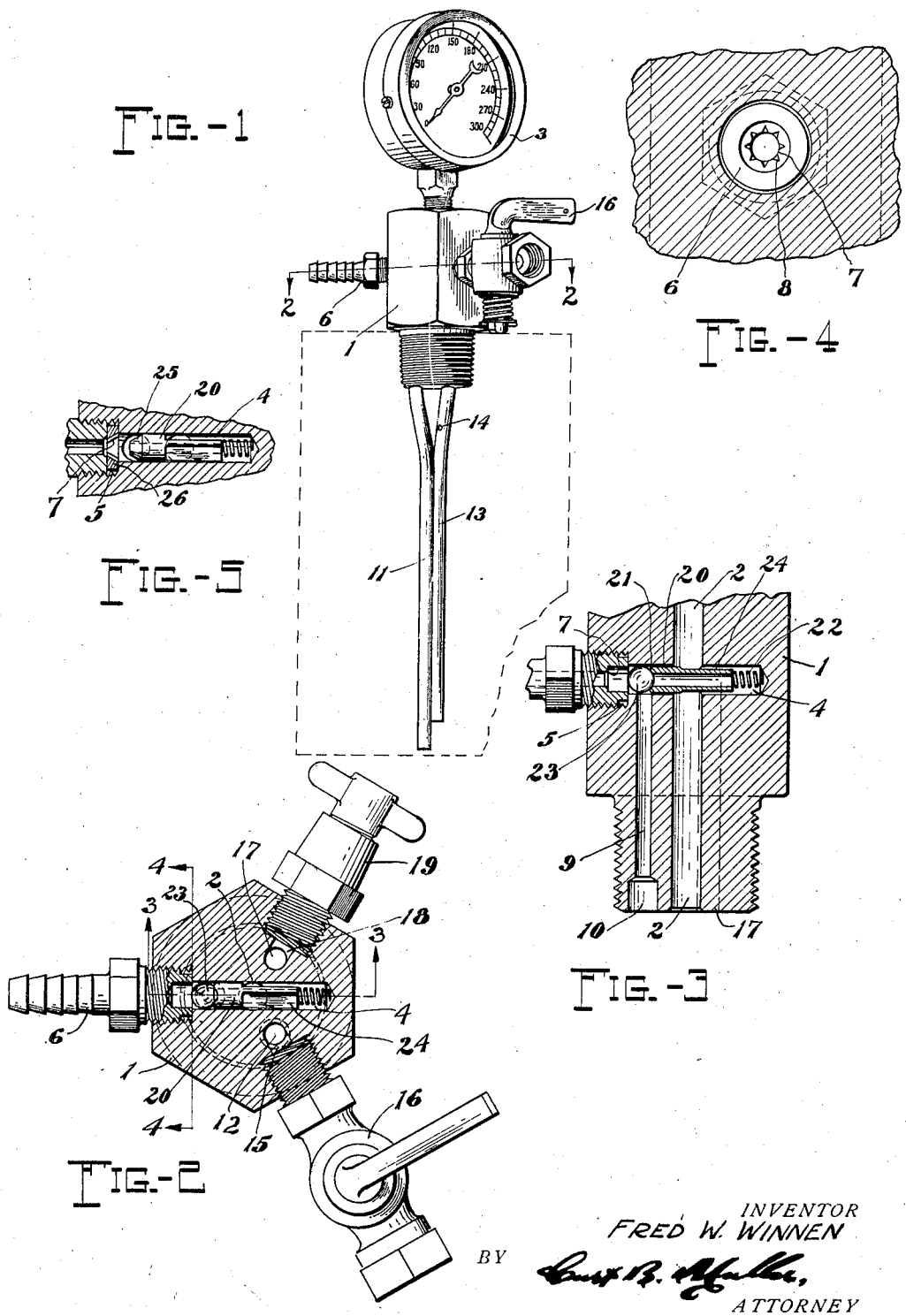

2,028,265

UNITED STATES PATENT OFFICE 2,028,265

FLUID PRESSURE SPRAY APPLIANCE

Frederick W. Winnen, Cleveland, Ohio

Application December 2, 1932, Serial No. 645,429
Renewed December 5, 1935

3 Claims. (Cl. 299—89)

My invention pertains to a fluid-pressure spray appliance and more particularly, as exemplified by the drawing, to a valve adapted to control spray delivery from a fluid reservoir.

My long experience with the use of the check valve feature of marketed spray devices has taught me that such feature has continued occasionally to fail to function as intended with a consequential back flow of liquid into the air line whenever the pressure in the latter chanced to fall below that obtaining in the reservoir.

Accordingly, the object of my invention, besides construction of the valve so as to be economical of manufacture, has been to originate a design which will reliably prevent or check an undesirable back flow of fluid into the air line.

Adverting to the drawing:—

Figure 1 is an elevation of a check valve embodying my invention, and in connection with a pressure gauge and adapted for hermetical connection with a fluid reservoir not shown.

Figure 2 is an enlarged plan section of the valve casing on line 2—2 of Figure 1, with certain attached accessories partly shown as a top elevation.

Figure 3 is a vertical section on line 3—3 of Figure 2.

Figure 4 is a further enlarged section on line 4—4 of Figure 2.

Figure 5 is a broken view of a portion of Figure 2 illustrating a modification of closure.

A hexagonal casing 1 has its lower end screw-threaded for interfitting with a tapped hole in a fluid reservoir (not shown). Centrally, the casing 1 is fashioned with a bore 2 which opens through the top and bottom of the casing. In screw-threaded connection with the upper end of the bore 2 is a pressure gauge 3.

Entering one face of the casing and as exemplifiedly shown extending at right angles across the bore 2 is a bore 4 which is closed at its inner end and has its outer end enlarged at 5 and adapted for the screw-threaded reception of a nipple 6 intended to be connected with a compressed-air line or hose not shown. The margin of the interior end of the hollow nipple 6 is fashioned as a conical seat 7 and the seat is supplied with a plurality of circumferentially arranged notches 8, as clearly appears in Figure 4 and for a purpose to be hereinafter explained.

The casing is also fashioned with a comparatively smaller duct 9 extending downwardly from the bore 4 at a point between the bore 2 and the seat 7. Where the duct 9 opens through the bottom of the casing it is somewhat enlarged at 10 to provide a socket for the reception of a tube 11 which is to extend to a point near the bottom of the reservoir.

The casing 1 is also provided with a vertically extending bore 12 which is open at its lower end and is to have fitted in such end a tube 13 and which is provided a short distance below the bottom of the casing with a vent hole 14. The upper end of the bore 12 intersects a laterally extending bore 15 with the enlarged outer end of which a control valve 16 is in connection. The valve 16 is to be connected with a spray discharge nozzle likewise unnecessary to have shown.

Still another vertically extending bore 17 is provided and as appears in Figure 2 the bores 9, 12 and 17 are equispaced circumferentially around the central bore 2. The bore 17 also opens through the bottom of the casing and its upper end similarly communicates with a lateral bore 18 the outer end of which is enlarged and fashioned for screw-threaded reception of a pressure-release valve 19.

Disposed for sliding reciprocation within the bore 4 is a tubular plunger 20 having its forward end 21, which is nearest the seat 7, fashioned as an annular portion of a spherical surface. A spring 22 which is disposed between the rear end of the plunger 20 and the closed end of the bore 4 is adapted normally to urge the plunger 20 forwardly and consequently likewise tends to hold against the seat 7 a ball 23 which occupies the bore 4 between the seat 7 and the forward end 21 of the plunger. The ball 23 will be forced against the forward end 21 of the plunger upon exposure to suitable pressure in the air line entry 6 and will in turn force the plunger 20 rearwardly against the action of the spring 22. Such rearward movement of the ball 23 and plunger 20 will be adequate to permit the compressed air to pass around the ball and downwardly through the duct 9. Upon disconnection of the pressure line or upon any unintentional reduction in pressure while the pressure line is in open communication through the nipple 6, the spring 22 will function promptly to propel the plunger 20 forwardly. Sufficient clearance or crosswise travel space for the ball will be provided to permit the spring 22 to advance the forward end 21 of the plunger across the smaller duct 9 whereby to close the upper end of the latter and thus prevent an objectionable back flow of fluid through the nipple 6. The spring may have sufficient tension to propel the plunger 20 forward to such an extent that its forward end will abut the nipple 6 or the tension need not be great enough for this. In either case the plunger will perform its desired function of cutting off duct 9 and passing air from the container back to the source of supply, when the air is not being forced into the container under pressure.

The rear end of the plunger 20 is segmentally cut away, as shown at three circumferentially arranged places 24 whereby to provide recesses or clearance with respect to the wall of the bore 4. At the termination of any use of my valve it is preferable to have occur a gradual release of the air pressure in the reservoir to prevent rise of fluid in the tube 11 and duct 9. My design of the rear end of the plunger and the imperfect seating of the ball 23 against the notches 8 within the nipple, subject to cutting off of the air line pressure, will permit release through the duct 2 rearwardly past the plunger 20 forwardly through the latter and around the rear and front sides of the ball when the latter is dislodged from the forward end of the plunger by the air release.

The modification of Figure 5, dispenses with the ball 23. In order to realize an equivalent result, the forward end of the plunger 20 is fashioned as a tapered nose 25 adapted imperfectly to engage the seat 7 whether that be provided on the nipple 6 or alternatively on the margin of an assembly sleeve 26 which is adjustably fitted in the inner end of the enlargement 5 of the bore 4.

It is to be realized that the scope of my invention comprehends many equivalent constructions. The showing of the drawing and the particular description are merely specific exemplifications of a plurality of mechanical embodiments and arrangements.

I claim:—

1. In combination with the liquid reservoir of a spray device, a casing sealably fitting into said reservoir and extending externally thereof, a conduit in said casing running from the external part thereof to communicate with said reservoir, said conduit having a notched valve seat therein, a duct communicating with said conduit between said notched seat and reservoir, a member slidable in said conduit and adapted in one position to cut off communication therewith of said duct, said member having a passage extending axially therethrough for air escape from said reservoir and a valve seat in the outer end of said passage and in opposed relation to said notched valve seat, a valve member movable between seats for alternate cooperation with said valve seats, resilient means for urging said slidable member toward said notched valve seat and to duct-closing position, and a tube communicating with said duct for projection into the liquid of the reservoir and for conducting air pressure externally applied through said bore.

2. In a spray device having a fluid tight liquid reservoir for forming the spray, a conduit running from a point outside of said reservoir and having a branch communicating with the liquid in the reservoir and a branch communicating above the level of the liquid therein, a tubular member slidably positioned in the conduit and communicating with the branch to the air in said reservoir and adapted to extend across and cut off the liquid-communicating branch of the conduit, resilient means for normally urging said member toward the outer end of said conduit and to the branch cutting off position, said tubular member being fashioned with a valve seat at its outer end, and a valve member loosely located in said conduit between, and adapted alternatively for cooperation with, said valve seat and the outer end of said conduit, whereby upon the introduction of pressure fluid into said conduit said valve will act to close the outer end of said tubular member and the latter will be moved away from its liquid branch cutting off position against the action of said resilient means and the pressure fluid will pass into the liquid communicating portion of said conduit.

3. A means for closing an opening in the top of a spray liquid reservoir comprising a casing, said casing carrying means for holding it in fluid tight engagement with said opening so that a first portion of said casing is exposed to the interior of said reservoir and another portion to the exterior of said reservoir, said casing having a bore extending thereinto from said other portion, and two ducts extending from said first portion and communicating with said bore at different points along its length, an inlet nipple in the outer end of said bore, a sleeve slidably fitting in said bore abutting said nipple and closing off communication with the outer of said ducts, a compression spring in said bore bearing against the inner end of said sleeve for holding said sleeve against said nipple, a notched valve seat in the inner end of said nipple, a loose ball valve between said valve seat and said sleeve for alternatively seating against the inlet nipple or for closing the passage through said sleeve, the inner end of said sleeve being cut away to provide free communication between the inner of said ducts and the passage through said sleeve, and a tube connected to the said outer duct where it opens through said first portion of said casing and adapted to extend to the bottom of the reservoir.

FREDERICK W. WINNEN.